United States Patent
Adimatyam et al.

(10) Patent No.: US 9,253,281 B2
(45) Date of Patent: Feb. 2, 2016

(54) CELLS AND/OR VANTAGE POINTS IN STREAMING MEDIA

(75) Inventors: Venkata S. Adimatyam, Irving, TX (US); Sameer Vasant Gavade, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 282 days.

(21) Appl. No.: 13/113,329

(22) Filed: May 23, 2011

(65) Prior Publication Data

US 2012/0303759 A1 Nov. 29, 2012

(51) Int. Cl.
*H04L 29/08* (2006.01)
*H04N 21/262* (2011.01)
*H04N 21/482* (2011.01)

(52) U.S. Cl.
CPC ........ *H04L 67/306* (2013.01); *H04N 21/26258* (2013.01); *H04N 21/4821* (2013.01); *H04N 21/4825* (2013.01)

(58) Field of Classification Search
CPC .......... H04N 7/17318; H04N 21/8456; H04N 21/26258; H04N 21/6125; H04N 21/47202; H04N 21/44209; H04N 21/41407; H04N 21/2223; H04N 21/44016; H04N 21/23439; G11B 27/034; G06F 17/30772; H04L 63/10; H04L 65/4084

USPC ................. 709/217, 219, 232, 231, 203, 224; 715/230, 733; 348/43; 386/224

See application file for complete search history.

(56) References Cited

U.S. PATENT DOCUMENTS

| | | | | |
|---|---|---|---|---|
| 8,069,414 | B2* | 11/2011 | Hartwig et al. | 715/719 |
| 2009/0028528 | A1* | 1/2009 | Harradine et al. | 386/117 |
| 2010/0169459 | A1* | 7/2010 | Biderman et al. | 709/219 |
| 2010/0295923 | A1* | 11/2010 | Mihashi et al. | 348/43 |
| 2011/0033172 | A1* | 2/2011 | Ando et al. | 386/355 |
| 2012/0144305 | A1* | 6/2012 | Bekiares et al. | 715/733 |

* cited by examiner

*Primary Examiner* — Un C Cho
*Assistant Examiner* — Oussama Roudani

(57) ABSTRACT

A client receives a playlist file associated with streams of media, and reads the playlist file to retrieve coordinates of multiple cells or to retrieve multiple vantage points, where each of the multiple cells or vantage points comprises a different media stream. The client determines an available bandwidth for receiving media streams, and receives selection of one or more of the multiple cells or one or more of the multiple vantage points. The client requests, based on the selection and the determined available bandwidth, one or more media streams corresponding to the selected one or more cells or vantage points. The client plays back the one or more streams corresponding to the selected one or more cells or vantage points. The client may include a laptop, palmtop or tablet computer, a cellular telephone, a personal digital assistant (PDA), a set top box (STB), or a television (TV).

23 Claims, 18 Drawing Sheets

US 9,253,281 B2

CELLS AND/OR VANTAGE POINTS IN STREAMING MEDIA

BACKGROUND

Hypertext Transfer Protocol (HTTP) Live Streaming (HLS) is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates. At the beginning of a streaming session, the client downloads a playlist file that specifies the different or alternate streams that are available.

In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, a client first obtains the playlist file and then obtains and plays each media file in the playlist in sequence.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement new attributes in informational tags within playlist files used in HTTP Live Streaming. One new attribute described herein permits the division of a client display into multiple cells, where each cell has certain dimensions and a specific location on the client display and where each cell displays a different media stream. Therefore, for example, a client display may be divided into four different cells, with each cell having a location on the client display and also having defined dimensions. A different user selected media stream may be simultaneously played back in each of the different cells. Another new attribute described herein permits the selection of one or more vantage points associated with content or a given subject that may be played back on the client display. For example, a user may select three different vantage points and simultaneously view them on the client display.

Figure 1:
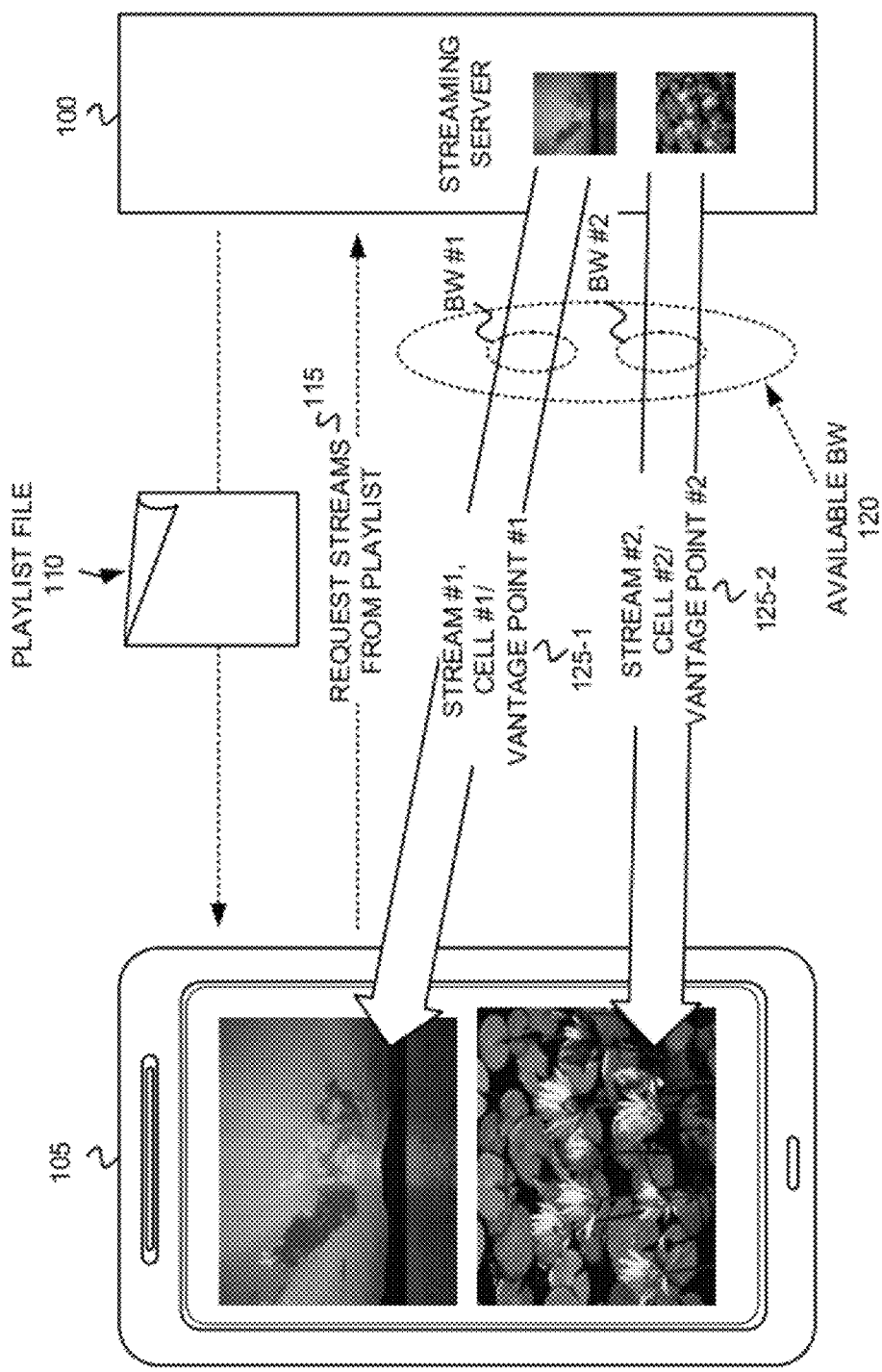
FIG. 1 is a diagram that depicts an overview of the delivery of one or more streams of media from a streaming server to a client, where each delivered stream of media includes a vantage point associated with specific content, and/or includes a cell comprising an individual view of content having specific dimensions.

FIG. 1 illustrates an overview of the delivery of one or more streams of media from a streaming server 100 to a client 105, where each delivered stream of media includes a vantage point associated with specific content, and/or includes a cell comprising an individual view of content having specific dimensions, such that multiple vantage points and/or cells may be displayed at client 105. As shown in FIG. 1, client 105 may obtain a playlist file 110 from streaming server 100. Playlist file 110 may include, for example, an ordered list of media Uniform Resource Identifiers (URIs) and informational tags, with each media URI referring to a media file which is a segment of a single continuous stream of media, or referring to another playlist file. Playlist file 110 may additionally include a required bandwidth for each media stream, cell coordinates for the dimensions of the view of each media stream, and/or a vantage point identifier that identifies the vantage point of the media stream relative to multiple vantage points associated with content of multiple different media streams. Playlist file 110 may be organized as set forth in the Internet Draft of "HTTP Live Streaming" dated Nov. 19, 2010, and as further described herein.

Upon receiving playlist file 110, client 105 may read the ordered list of media URIs and informational tags of playlist file 110 and may request 115 one or more media streams identified in playlist file 110. The one or more media streams requested by client 105 may include one or more cells and/or vantage points, with each cell and vantage point being associated with its own media stream. Cells and vantage points are further described below with respect to FIGS. 2A and 2B. Client 105 may request the one or more media streams based on the required bandwidth (e.g., BW #1 and BW #2 shown in FIG. 1) for each stream, as specified in playlist file 110, and based on the bandwidth 120 that is available to client 105 via, for example, a connection or link to a network (not shown) that carries streams from streaming server 100. Client 105 may request the one or more media streams based further on user selection of one or more cells and/or one or more vantage points from playlist file 110. Based on request 115, streaming server 100 may send one or more appropriate streams to client 105. For example, as depicted in FIG. 1, streaming server 100 may send media files associated with a stream #1 125-1, that includes a cell #1 and/or a vantage point #1, and media files associated with a stream #2 125-2, that includes a cell #2 and/or a vantage point #2.

Figure 2A:
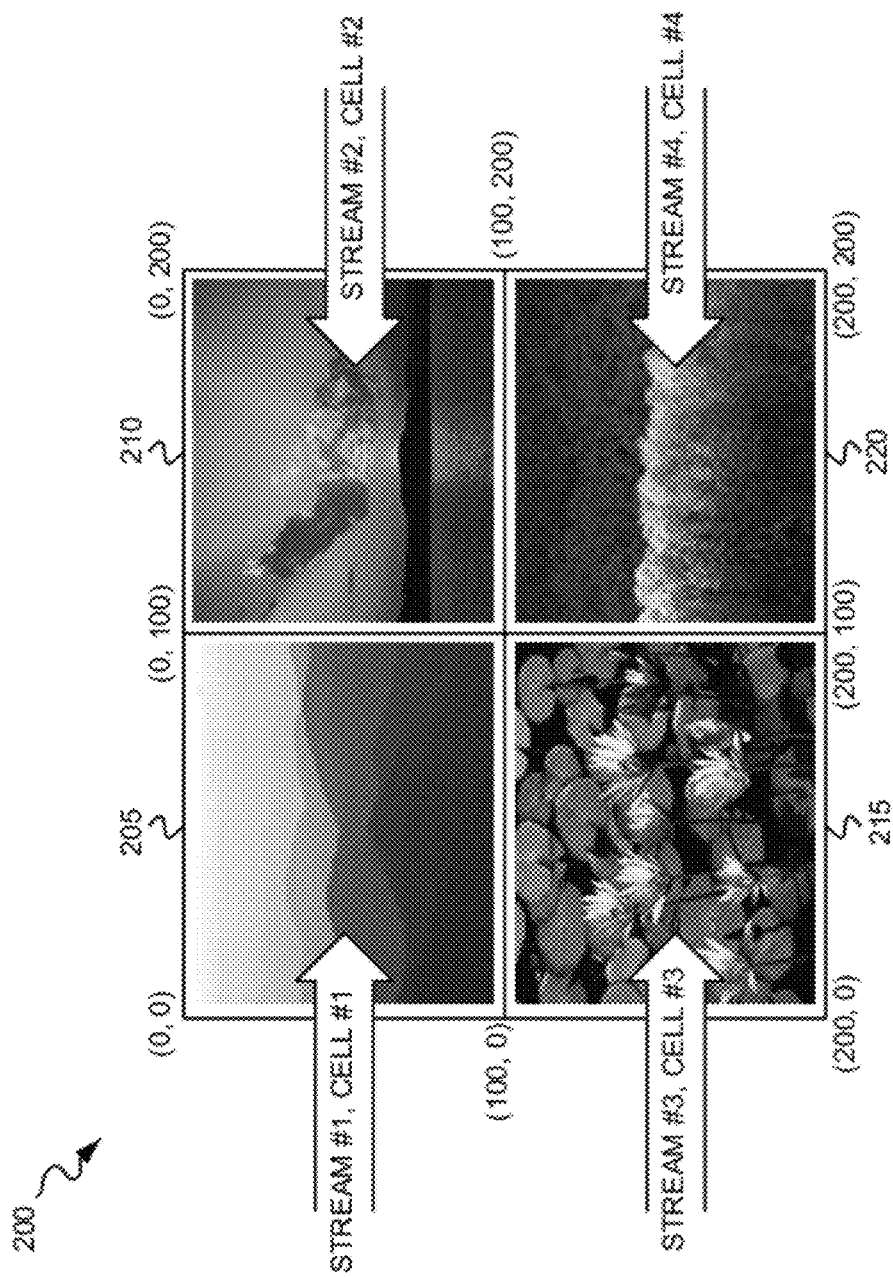
FIG. 2A is a diagram that depicts the display of multiple cells in a grid on a display of a client, where each cell corresponds to a different media stream.

FIG. 2A depicts a client display that includes a grid 200 that consists of multiple cells, with each cell of the multiple cells having a specified location and dimensions within grid 200. Each cell of grid 200 includes an individual view that displays a media stream. FIG. 2A illustrates one example of a grid 200 in which grid 200 comprises four equal sized cells with cell #1 205 consisting of a cell having a length and width of 100 (e.g., corners at cell coordinates (0,0); (0,100); (100, 0); (100, 100)), cell #2 210 consisting of a cell having a length and width of 100 (e.g., corners at cell coordinates (0,100); (0,200); (100,100); (100, 200)), cell #3 215 consisting of a cell having a length and width of 100 (e.g., corners at cell coordinates (100,0); (100,100); (200,0); (200, 100)) and cell #4 220 consisting of a cell having a length and width of 100 (e.g., corners at cell coordinates (100,100); (100,200); (200, 100); (200, 200)). Cells #1-4 may each display different media streams received from streaming server 100. A client may transform the coordinates and dimensions of cells #1-4 of grid 200 into local client coordinates prior to displaying the media streams in their respective cells.

Figure 2B:
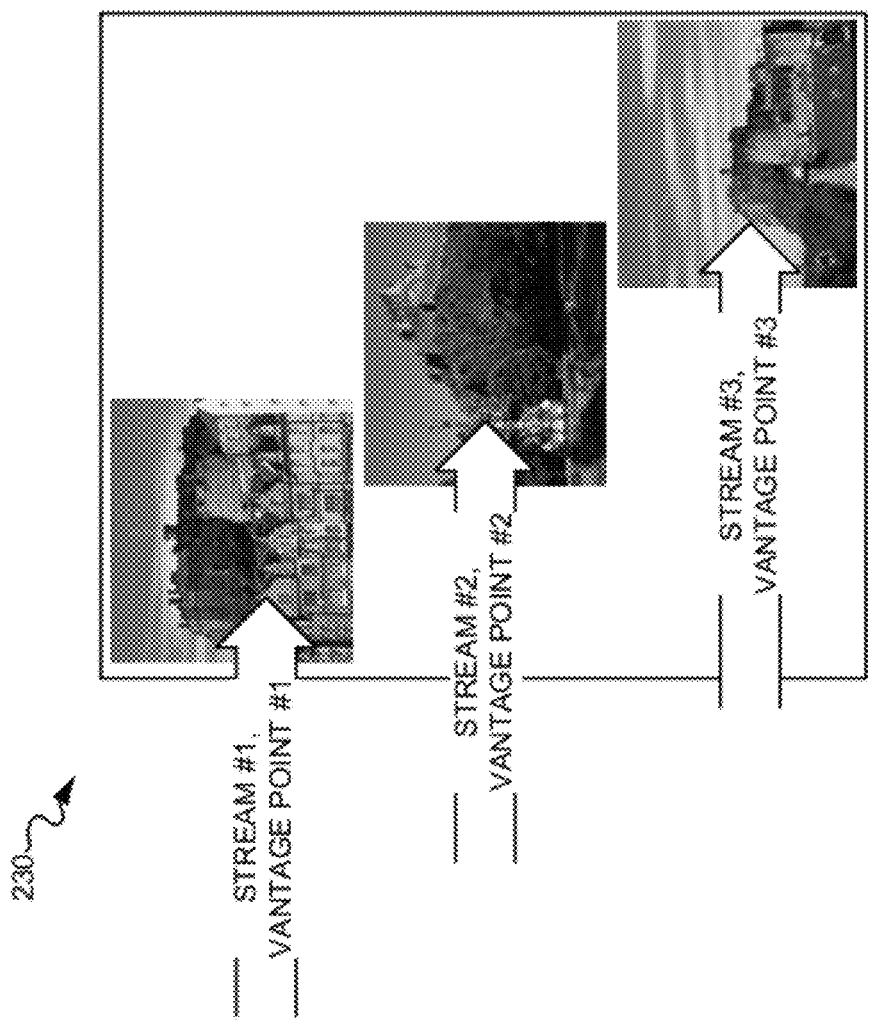
FIG. 2B is a diagram that depicts the display of multiple vantage points on a display of a client, where each vantage point corresponds to a different media stream.

FIG. 2B is a diagram that depicts the display of multiple vantage points on a display 230 of client 105, where each vantage point corresponds to a different media stream. As shown in FIG. 2B, multiple media streams may be displayed at a client, with each media stream depicting a different vantage point associated with certain content or subject matter. For example, as shown in FIG. 2B, each media stream may depict a different view of a historical building, with each view being taken from a different vantage point relative to the historical building. FIG. 2B depicts an example in which three different streams (e.g., streams #1-3) include three different vantage points (e.g., vantage points #1-3). The user may select the different vantage points, shown in FIG. 2B, for viewing on display 230 of client 105.

Figure 3:
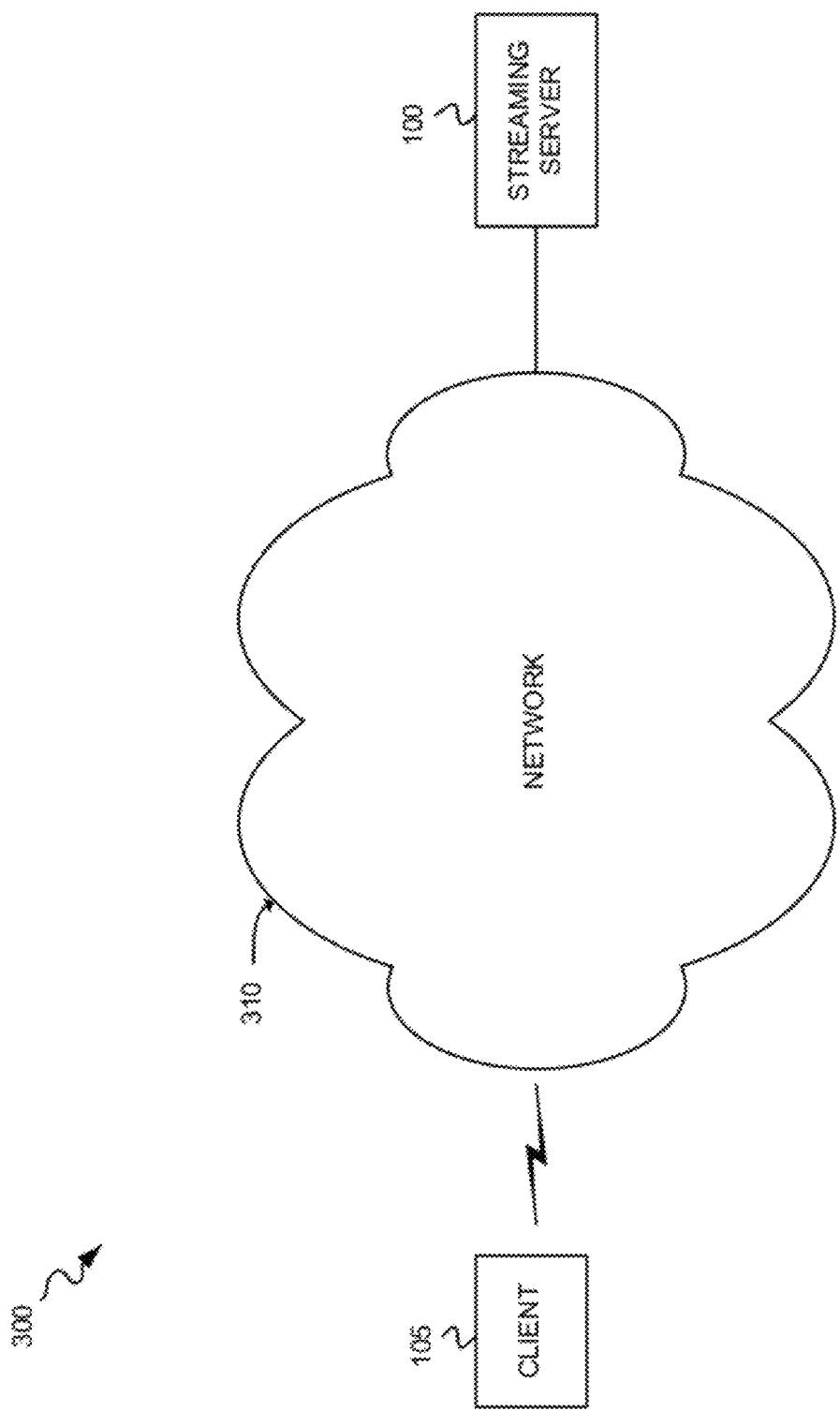
FIG. 3 is a diagram that illustrates an exemplary network environment in which one or more streams of media may be delivered from a server to a client.

FIG. 3 is a diagram that illustrates an exemplary network environment 300 in which one or more streams of media may be delivered from a server to a client. As shown in FIG. 3, network environment 300 may include client 105, streaming server 100, and a network 310. Client 105 may include a network device, such as, for example, a laptop, palmtop or tablet computer, a cellular telephone (e.g., a smart phone), a personal digital assistant (PDA), a set top box (STB), or a television (TV). Streaming server 100 may include a network device that may store playlist files and associated media files for streaming to client 105.

Network 310 may include any type of network, or combination of networks, that may deliver streaming media between server 100 and client 105. Network 310 may include a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, the Internet, or a cable network (e.g., an optical cable network).

The configuration of network components of network environment 300 illustrated in FIG. 3 is for illustrative purposes only. Other configurations may be implemented. Therefore, network environment 300 may include additional, fewer and/or or different components than those depicted in FIG. 3. For example, a single client 105 and a single streaming server 100 are shown in FIG. 3. Network environment 300, however, may include multiple different clients 105 and multiple different streaming servers 100.

Figure 4:
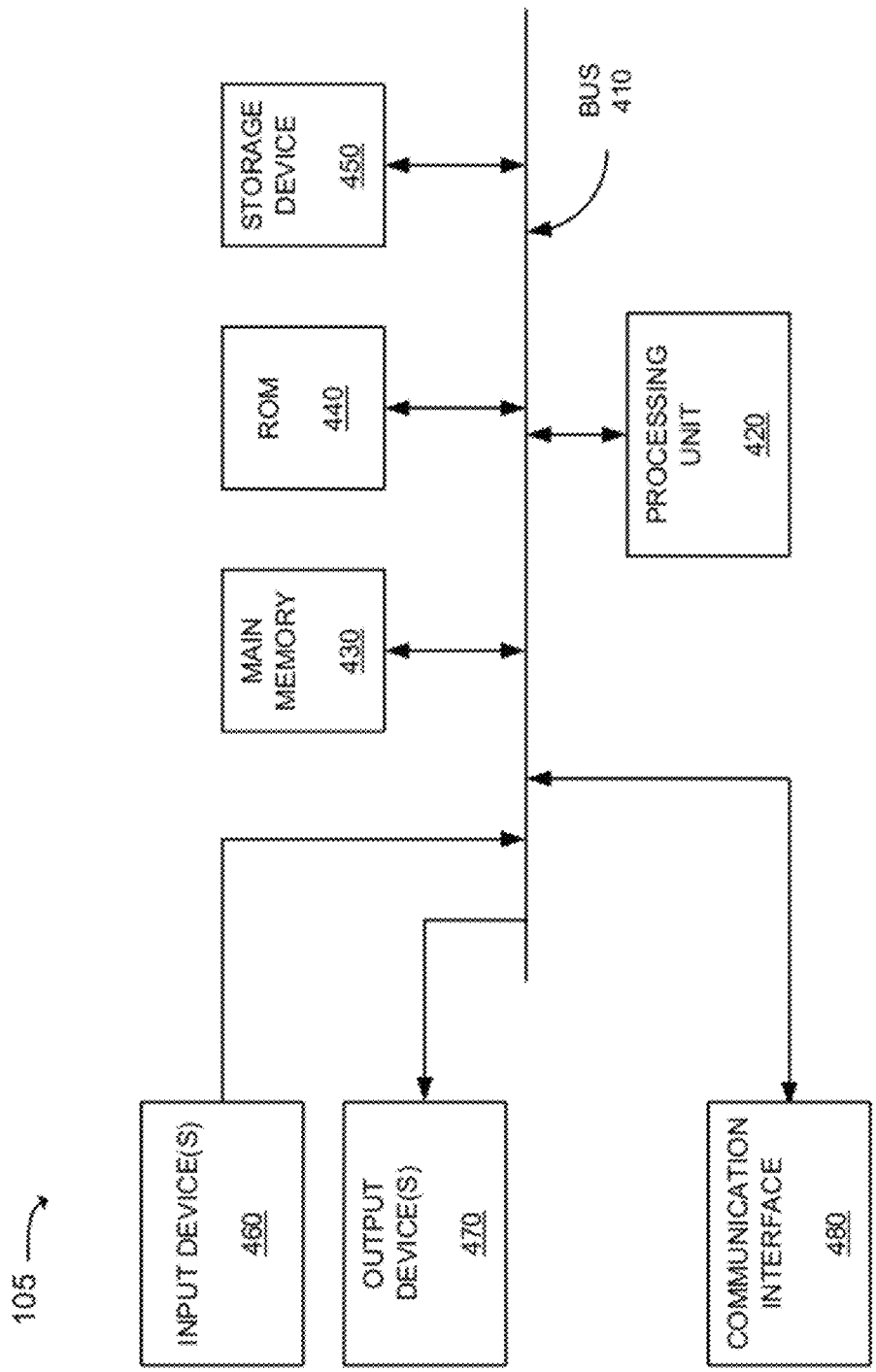
FIG. 4 is a diagram that depicts exemplary components of the client of FIG. 3.

FIG. 4 is a diagram that depicts exemplary components of client 105. Streaming server 100 may be similarly configured. Client 105 may include a bus 410, a processing unit 420, a main memory 430, a read only memory (ROM) 440, a storage device 450, an input device(s) 460, an output device(s) 470, and a communication interface 480. Bus 410 may include a path that permits communication among the elements of client 105.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium.

Input device 460 may include one or more mechanisms that permit an operator to input information to client 105, such as, for example, a keypad or a keyboard, a mouse, a display with a touch sensitive panel, voice recognition and/or biometric mechanisms, etc. Output device 470 may include one or more mechanisms that output information to the operator, including a display, a speaker, etc. Communication interface 480 may include any transceiver mechanism that enables client 105 to communicate with other devices and/or systems. For example, communication interface 480 may include wired or wireless transceivers for communicating via network 310.

The configuration of components of client 105 illustrated in FIG. 4 is for illustrative purposes only. Other configurations may be implemented. Therefore, client 105 may include additional, fewer and/or different components than those depicted in FIG. 4.

Figure 5:
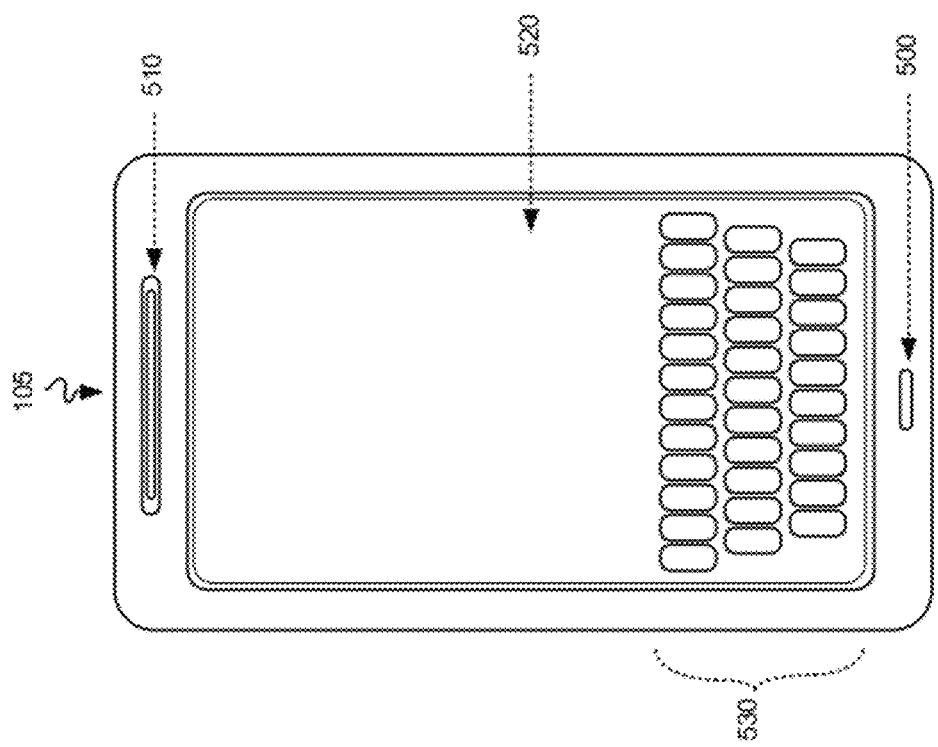
FIG. 5 is a diagram that depicts an exemplary external view of the client of FIG. 4.

FIG. 5 illustrates an exemplary implementation of client 105 in which client 105 includes a cellular telephone (e.g., a smart phone). As shown in FIG. 5, the cellular telephone may include a microphone 500 (e.g., of input device(s) 460) for entering audio information into client 105, a speaker 510 (e.g., of output device(s) 470) for providing an audio output from client 105, and a display 520 (e.g., of input device(s) 460 or output device(s) 470) for visually displaying data. Display 520 may include, for example, a liquid crystal display (LCD), a cathode ray tube (CRT) display, an organic light-emitting diode (OLED) display, a surface-conduction electro-emitter display (SED), a plasma display, a field emission display (FED), a bistable display, etc. Display 520 may additionally include a touch panel that may permit control of client 105 via touch input by a user. The touch panel may be integrated with, and/or overlaid on, display 520 to form a touch screen or a panel-enabled display that may function as a user input interface. For example, in one implementation, the touch panel may include a near field-sensitive (e.g., capacitive), acoustically-sensitive (e.g., surface acoustic wave), photo-sensitive (e.g., infrared), and/or any other type of touch panel that allows a display to be used as an input device. In another implementation, the touch panel may include multiple touch-sensitive technologies. Generally, the touch panel may include any kind of technology that provides the ability to identify the occurrence of a touch upon display 520. As further shown in FIG. 5, display 520 may include a virtual keypad 530 that may be used in conjunction with a touch panel to receive user input to client 105.

Figure 6:
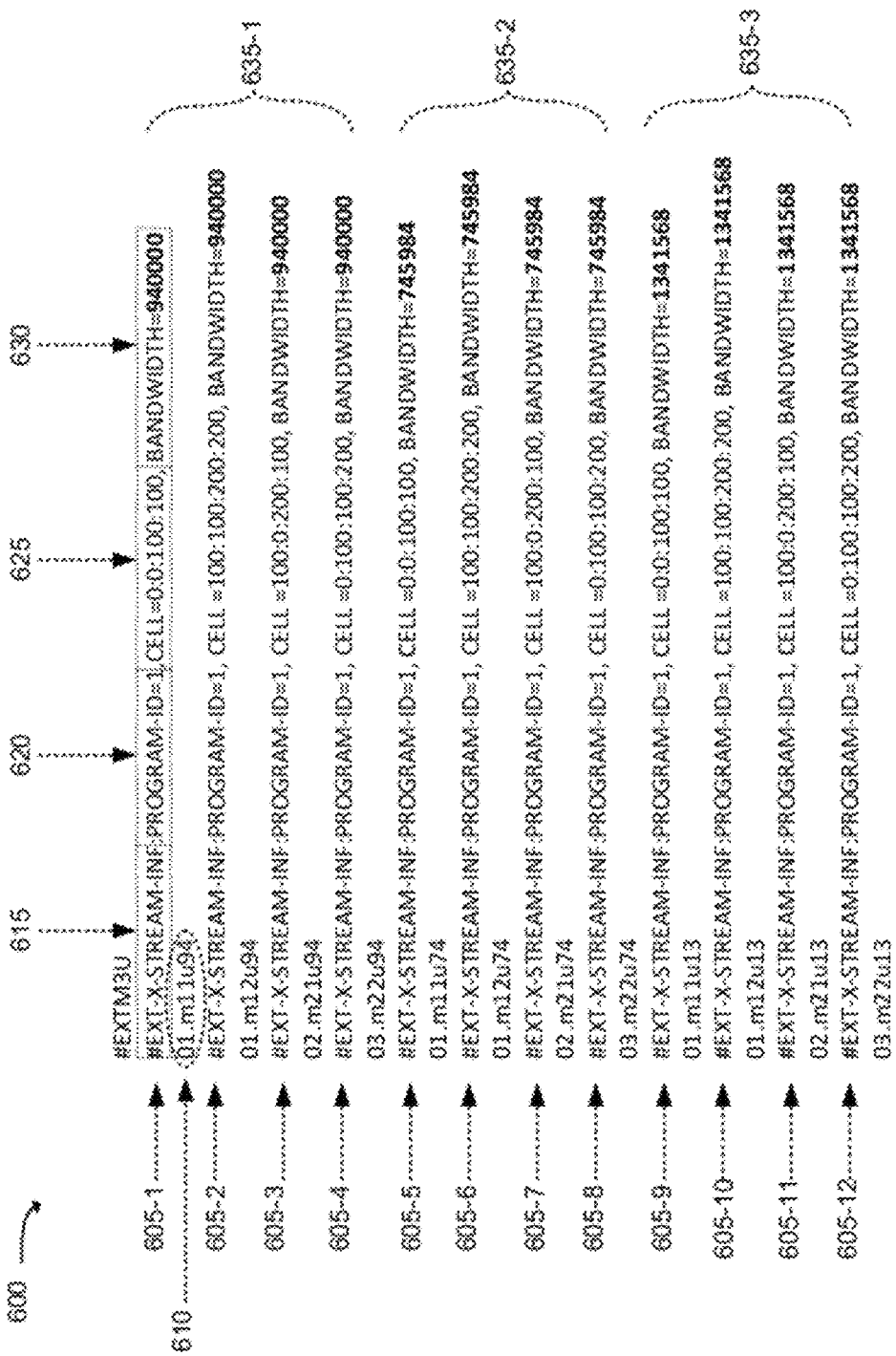
FIG. 6 is a diagram that illustrates an exemplary playlist file having cell dimensions assigned to different media streams.

FIG. 6 is a diagram that illustrates an exemplary playlist file 600 having cell dimensions assigned to different media streams. The cell dimensions may define a size and location of an individual view of a corresponding media stream. Playlist file 600 may include a list of multiple tags (605-1 through 605-12 shown in the example in FIG. 6), with each tag being followed by a URI 610 that refers to a media file, or to another playlist file.

In the example of FIG. 6, each tag of playlist file 600 includes the "EXT-X-Stream-INF" tag 615 followed by a list of attributes. The attributes may include a program ID attribute 620, a cell coordinates attribute 625, and a bandwidth attribute 630. "EXT-X-Stream-INF" tag 615 indicates that the next URI in the playlist (URI 610 for tag 615 shown in FIG. 6) identifies another playlist file that itself may further identify a sequence of media files to be used for media playback. Program ID attribute 620 may uniquely identify a particular presentation within the scope of playlist file 600. Cell coordinates attribute 625 may specify coordinates of a cell that defines the individual view that displays a given media stream. In the example of FIG. 2A, grid 200 includes four cells, each having equal dimensions for displaying four different media streams. Therefore, in the example of FIG. 2A, either 1, 2, 3 or 4 cells may be displayed and played back simultaneously. Bandwidth attribute 630 may include an integer number that represents bits per second. The bits per second specific in bandwidth attribute 630 set an upper bound on the overall bit rate of each media file (i.e., a maximum required bandwidth) of the corresponding media stream. Each different bandwidth attribute 630 for the same cell coordinates and program identifier may represent encoding of the content identified by the program identifier.

As depicted in FIG. 6, playlist file 600 may be grouped by the values in bandwidth attributes 630. For example, a group 635-1 of cell coordinates may have a bandwidth of 940,000 bits per second. Another group 635-2 of cell coordinates may have a bandwidth of 745,984 bits per second. A further group 635-3 of cell coordinates may have a bandwidth of 1,341,568 bits per second.

Figure 7:
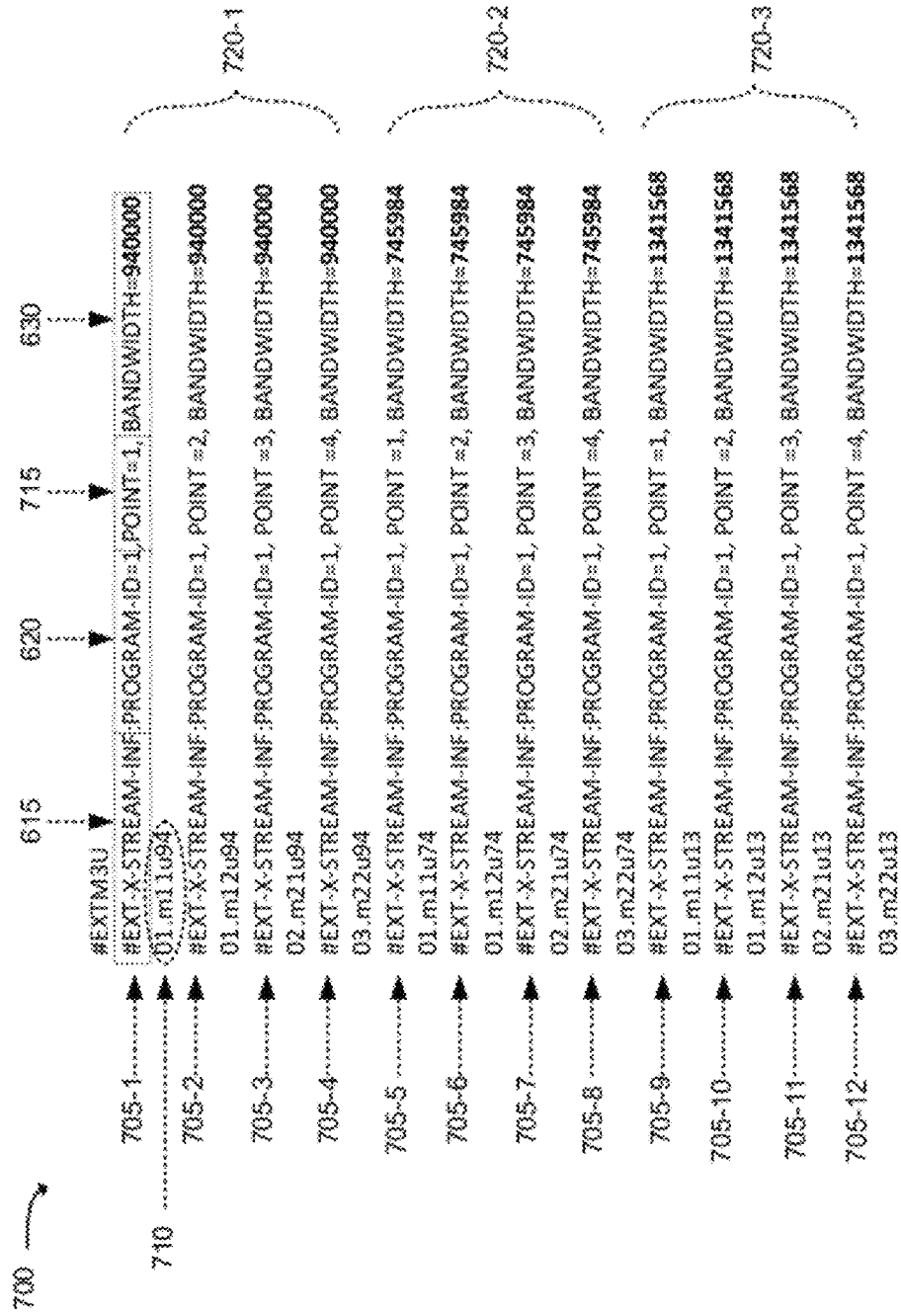
FIG. 7 is a diagram that illustrates an exemplary playlist file where different streams of data are associated with different vantage points.

FIG. 7 is a diagram that illustrates an exemplary playlist file 700 where different streams of data are associated with different vantage points. Each different vantage point may include a view of the same content or the same subject matter that is from a different vantage point than each other vantage point. Playlist file 700 may include a list of multiple tags (705-1 through 705-12 shown in the example in FIG. 7), with each tag being followed by a URI 710 that refers to a media file or to another playlist file.

In the example of FIG. 7, each tag of playlist file 700 includes "EXT-X-Stream-INF" tag 615 followed by a list of attributes. The attributes may include program ID attribute 620, a vantage point attribute 715, and bandwidth attribute 630. Vantage point attribute 715 may identify a particular vantage point of content associated with the program identified by program ID attribute 620. As further shown in FIG. 7, playlist file 700 may be grouped by the values in bandwidth attributes 630. For example, a group 720-1 of vantage points may have a bandwidth of 940,000 bits per second. Another group 720-2 of vantage points may have a bandwidth of 745,984 bits per second. A further group 620-3 of vantage points may have a bandwidth of 1,341,568 bits per second.

FIGS. 6 and 7 depict cell coordinate attribute 625 and vantage point ID attribute 715 being used separately within an informational tag. However, in some implementations, cell coordinate attribute 625 and vantage point ID attribute 715 may be used in the same information tag. For example, cell coordinate attribute 625 may define the location and dimensions of a vantage point identified by attribute 715 on display 520 of client 105.

Figure 8A:
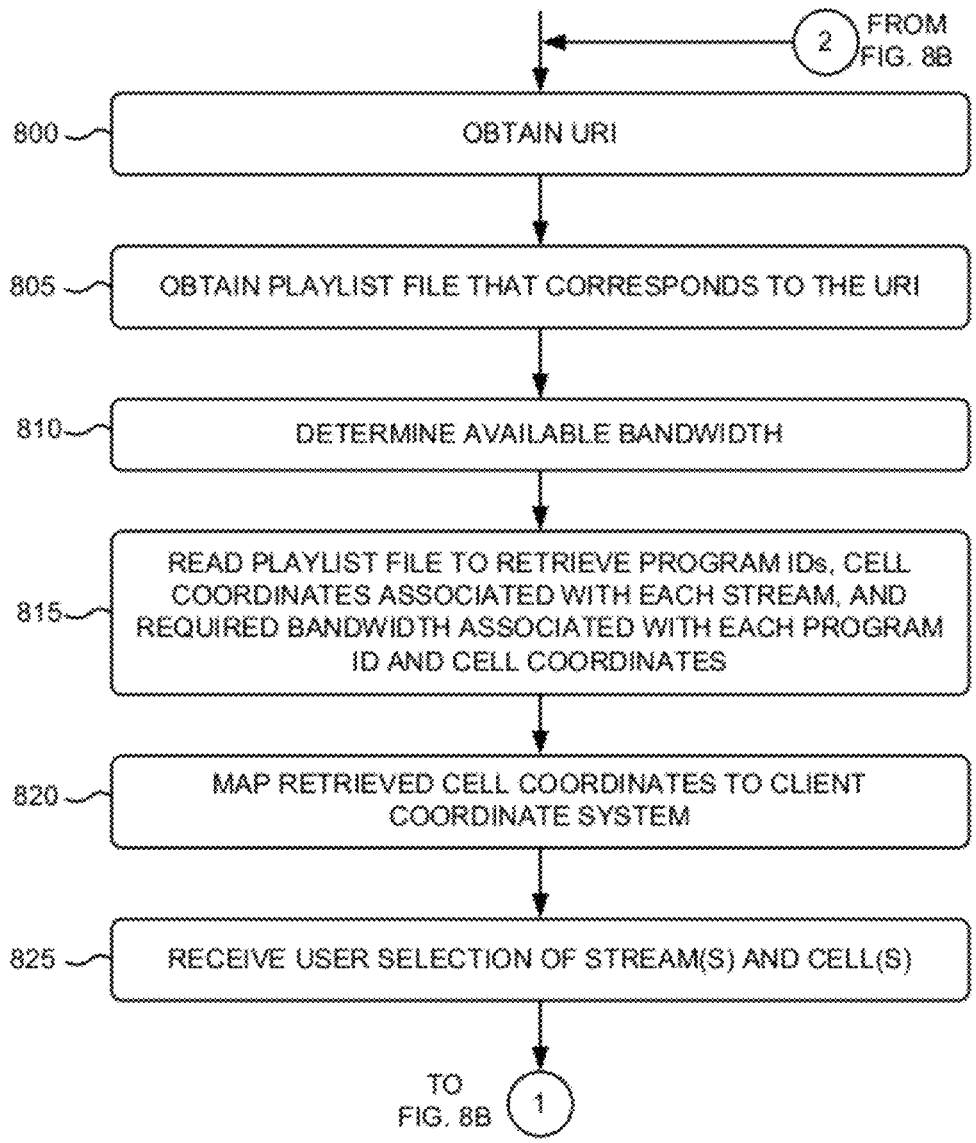
FIGS. 8A and 8B are flow diagrams that illustrate an exemplary process for obtaining a playlist file and selecting media streams, having corresponding cell dimensions, for playback.
Figure 8B:
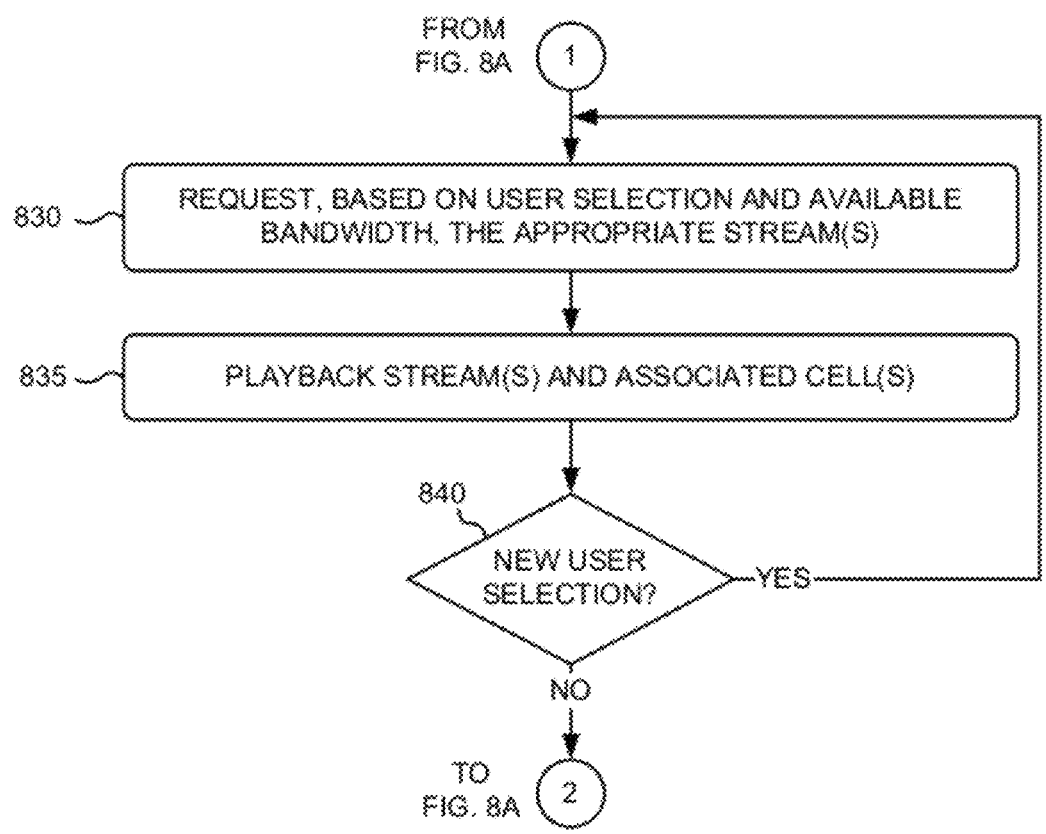

FIGS. 8A and 8B are flow diagrams that illustrate an exemplary process for obtaining a playlist file and selecting media streams, having corresponding cell dimensions, for playback. The exemplary process of FIGS. 8A and 8B may be implemented by client 105. The exemplary process of FIGS. 8A and 8B is described below with reference to the messaging diagram of FIG. 9 and the user selection examples of FIGS. 10A-10C.

Figure 9:
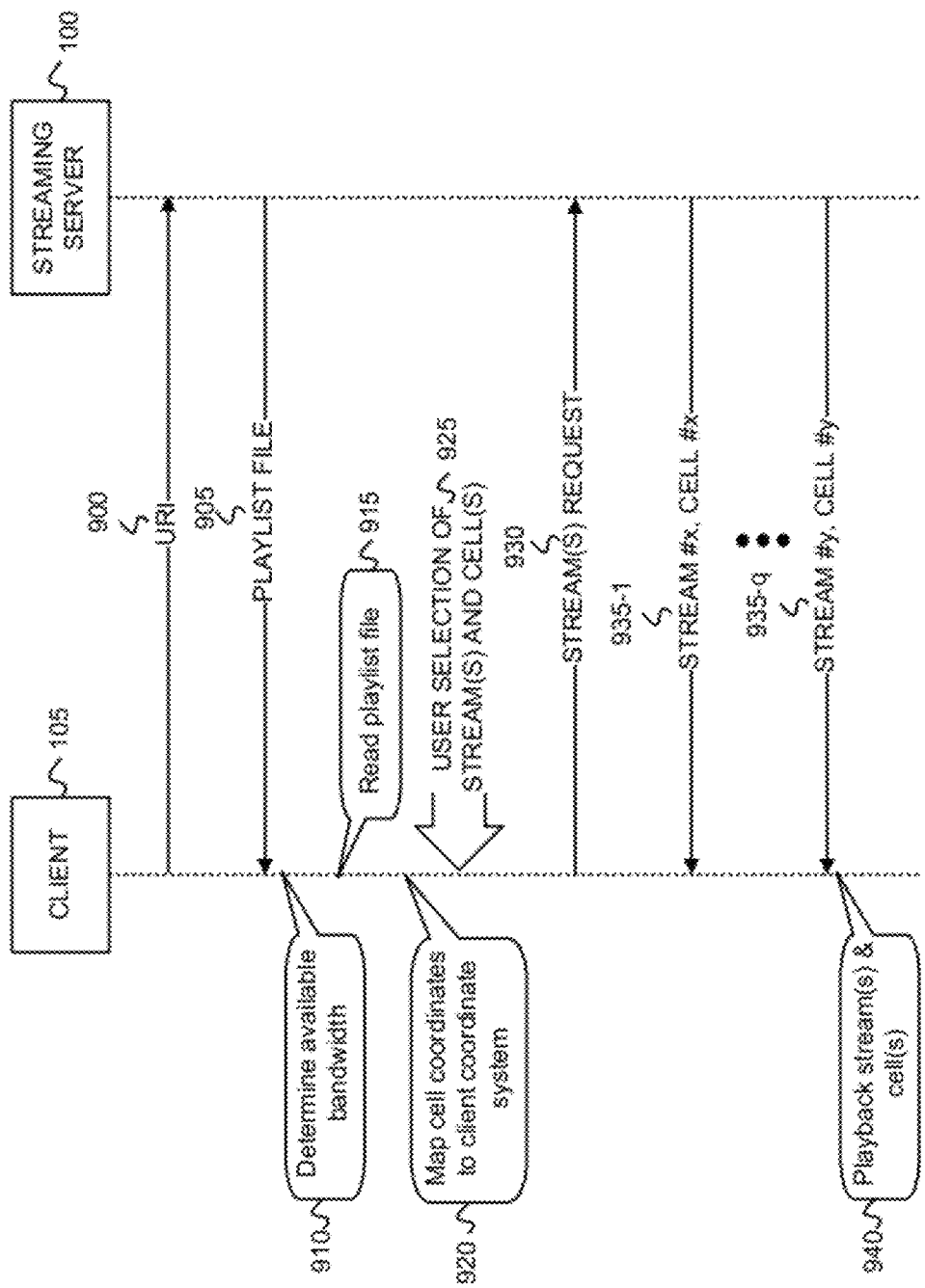
FIG. 9 is a diagram that illustrates exemplary messaging associated with the process of FIGS. 8A and 8B.

The exemplary process may include obtaining a Uniform Resource Identifier (URI) (block 800). Client 105 may, for example, obtain the URI for a given media presentation from streaming server 100, or possibly from another node in network 310. Client 105 may obtain a playlist file that corresponds to the URI (block 805). As shown in FIG. 9, client 105 may send the URI 900 obtained in block 800 to streaming server 100 to retrieve a corresponding playlist file 905.

Client 105 may determine the available bandwidth for receiving media streams from streaming server 100 (block 810). The available bandwidth may include, for example, the total bandwidth that may be utilized by client 105 in communicating via network 310, or the available bandwidth may include only some portion of the total bandwidth that may be utilized by client 105 that is designated for use by media streams. As depicted in FIG. 9, client 105 determines 910 the available bandwidth for receiving media streams. Client 105 may read the playlist file to retrieve program identifiers (IDs), cell coordinates associated with each stream, and the required bandwidth associated with each program ID and cell coordinates (block 815). Referring to playlist file 600 of FIG. 6, client 105 may read each tag 605-1 through 605-12 of playlist file 600 to retrieve a program ID attribute 620, cell coordinate attributes 625 and a bandwidth attribute 630. FIG. 9 depicts client 105 reading 915 playlist file 905 received from streaming server 100.

Client 105 may map the retrieved cell coordinates to the client coordinate system (block 820). Cell coordinate attributes 625 retrieved from playlist file 600 may be specified in a particular coordinate system that may be different than that used by client 105. Client 105 may map (e.g., transform) the retrieved cell coordinate attributes to client 105's coordinate system. FIG. 9 depicts client 105 mapping 920 the cell coordinates from the playlist file to the client coordinate system.

Figure 10A:
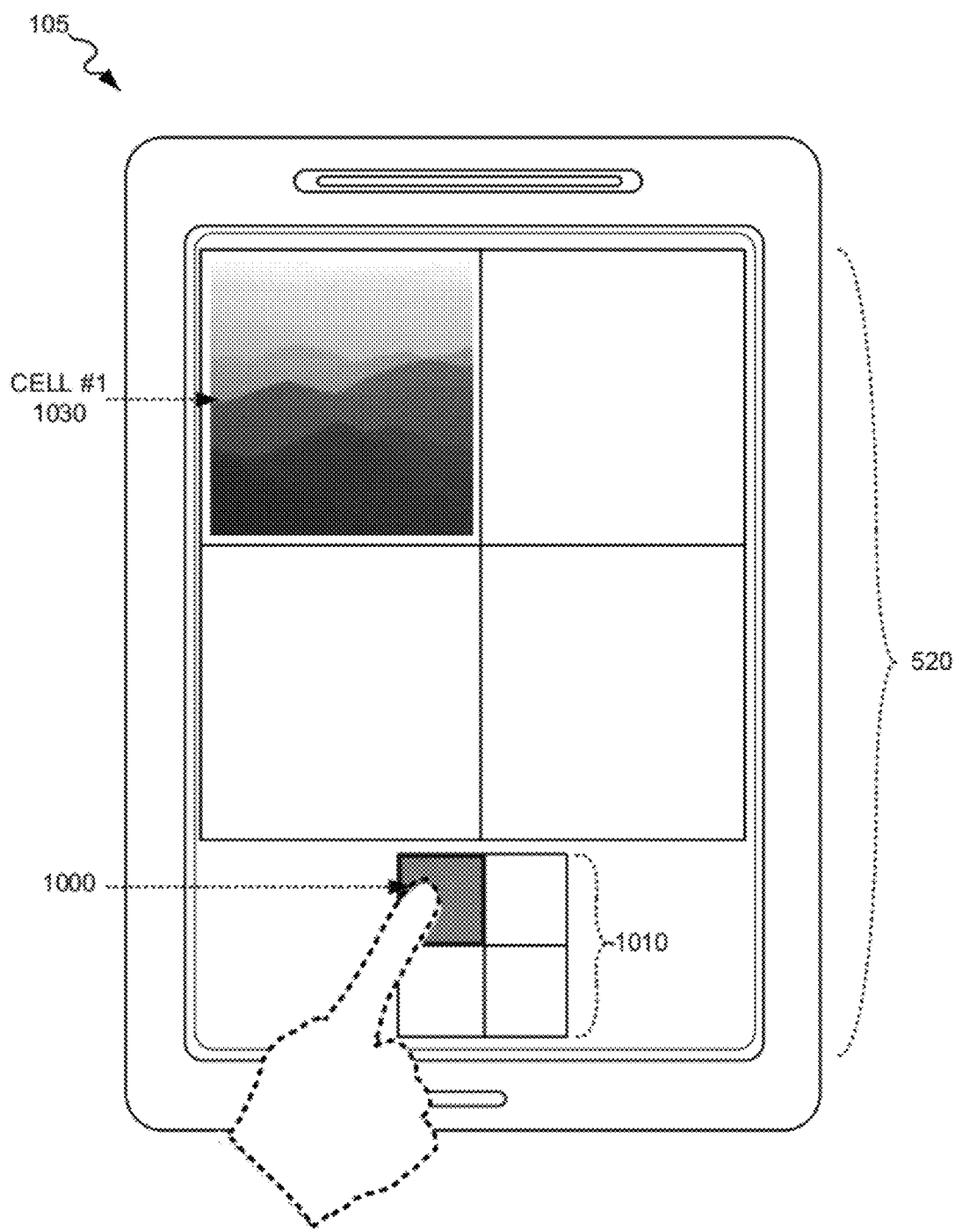
FIGS. 10A-10C are diagrams that depict examples of the display of streams of media, on a display of a client, with each stream corresponding to a cell having certain dimensions on the display.
Figure 10B:
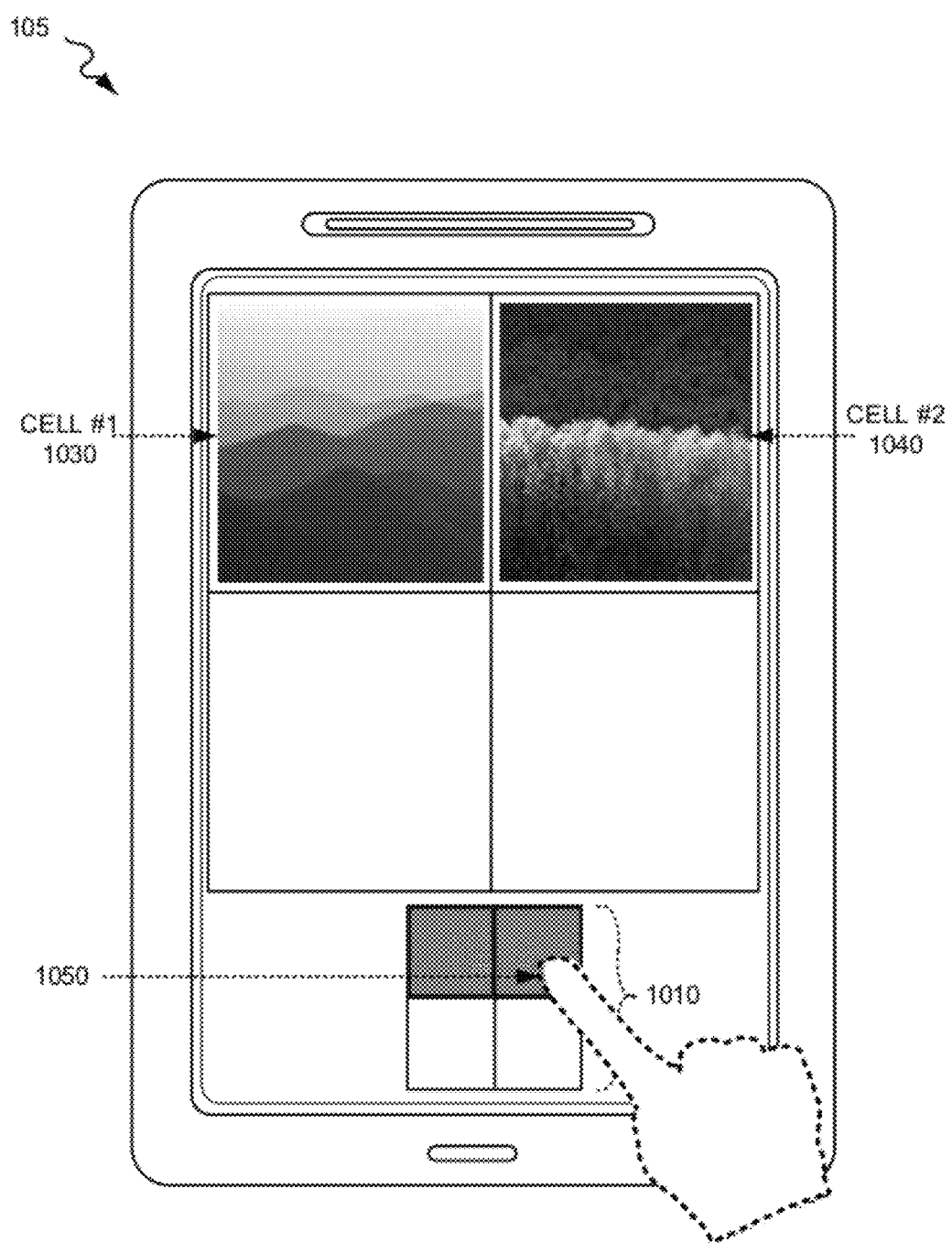
Figure 10C:
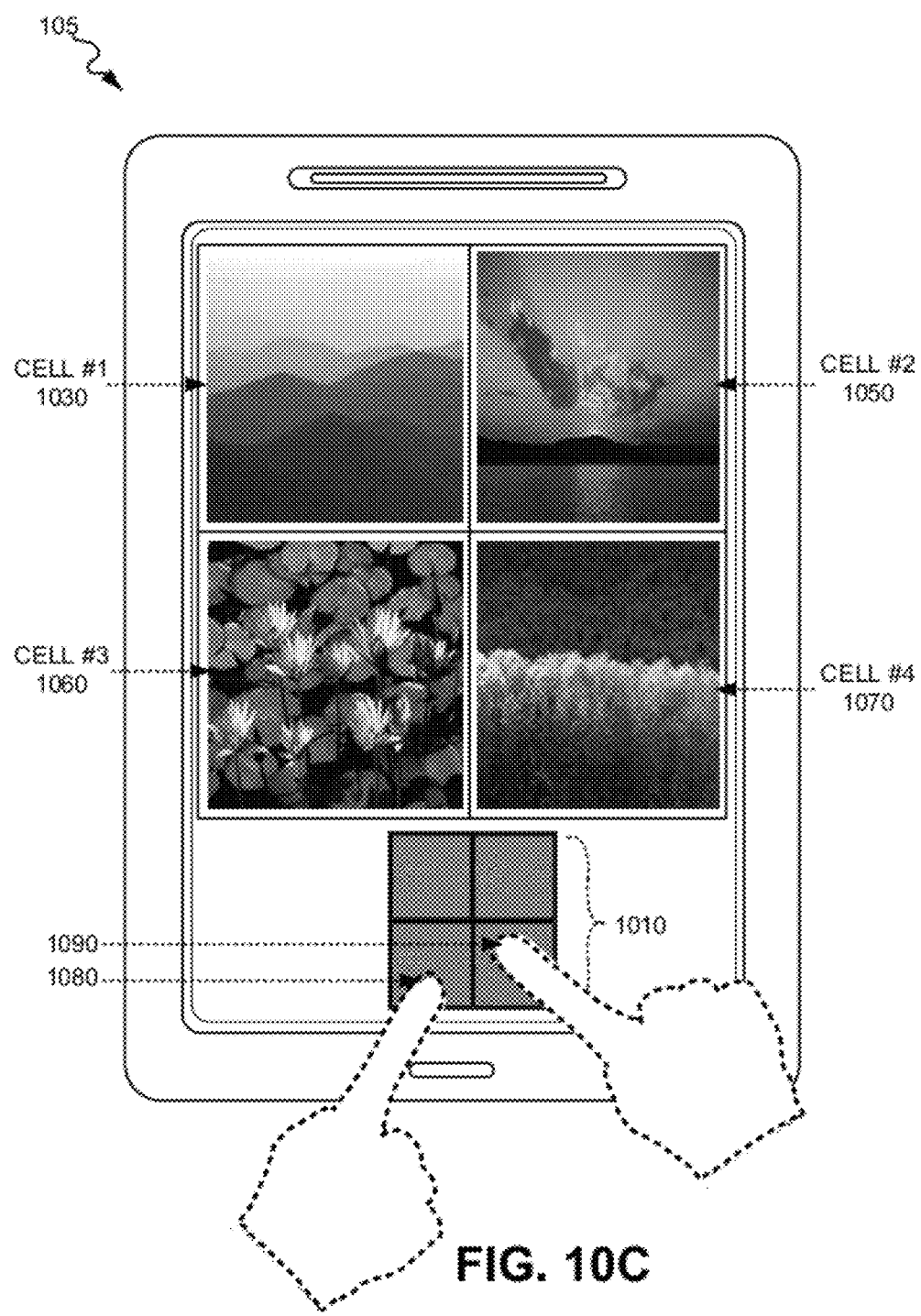

Client 105 may receive user selection of a stream(s) and its corresponding cell(s) (block 825). Client 105 may receive user selection of a stream(s) and its corresponding cell(s) via input device(s) 460. For example, as shown in FIGS. 10A-10C, a touch panel of a display 520 of client 105 may be used as a touch interface to enable a user to select a stream(s) and its corresponding cell(s). In other examples, a physical or virtual keyboard, or a mouse, etc. may be used to enter a user selection. As shown in FIG. 10A, a first user touch input 1000 may be applied to a selection region 1010 of display 520. User touch input 1000 may select, as shown in FIG. 10A, cell #1 1030 of the grid displayed on display 520. FIG. 10B depicts a subsequent selection of cell #2 1040 of the displayed grid via application of another user touch input 1050 to an appropriate portion of selection region 1010 of display 520. FIG. 10C further depicts selection of cell #3 1060 and cell #4 1070 of the displayed grid via application of respective user touch inputs 1080 and 1090 to appropriate portions of selection region 1010 of display 520. FIG. 10C, therefore, depicts the display of a different stream in each of the four available cells in the displayed grid. Referring back to FIG. 9, a user selection 925 of a stream(s) and corresponding cell(s) may be received at client 105. FIGS. 10A-10C depict a single example of the use of selection region 1010 for selecting one or more cells for viewing on display 520. Other different ways of user selection of cells for viewing on display 520 may be used. For example, the user may select (e.g., touch) a given cell itself (i.e., a region on display 520 where cell is to be displayed) to view a stream in that cell.

Client 105 may request, based on the user selection and the available bandwidth determined in block 810, the appropriate stream(s) and associated cell(s) (block 830). Referring to playlist file 600 of FIG. 6, client 105 may examine bandwidth attributes 630 of the user selected cells (i.e., defined by cell coordinates in attribute 625) and determine which combination of required bandwidths can be supplied to client 105 such that the available bandwidth determined in block 810 is not exceeded. Client 105 may select the media streams whose total maximum required bandwidth is less than the available bandwidth determined in block 810. FIG. 9 depicts client 105 sending a stream(s) request 930 to streaming server 100 to obtain the sequence of media files for playback at client 105.

Client 105 may playback the requested stream(s) and associated cell(s) (block 835). Client 105 may retrieve the appropriate sequence of media files for each requested stream and play the media files in a corresponding cell specified by cell coordinates attribute 625. As shown in FIG. 9, in response to stream(s) request 930, streaming server 100 may send a sequence of media files associated with each stream and cell requested by client 105. For example, FIG. 9 depicts media files associated with selected stream #x and cell #x 935-1 being sent to client 105. FIG. 9 further depicts media files associated with selected stream #y and cell #y 935-$q$ being sent to client 105. FIG. 9 further shows client 105 playing back 940 the stream(s) and cell(s) received at client 105.

Client 105 may determine whether a new user selection has been received (block 840). Client 105 may receive a new user selection of a stream(s) and its corresponding cell(s) via input device(s) 460. For example, a touch panel of a display of client 105 may be used as a touch interface to enable a user to select a new stream(s) and its corresponding cell(s). In other examples, a physical or virtual keyboard, or a mouse, etc. may be used to enter a new user selection. If a new user selection has been received (YES—block 840), then the exemplary process may return to block 830 with another request to streaming server 100. If a new user selection has not been received by client 105 (NO—block 840), then the exemplary process may return to block 800.

Figure 11:
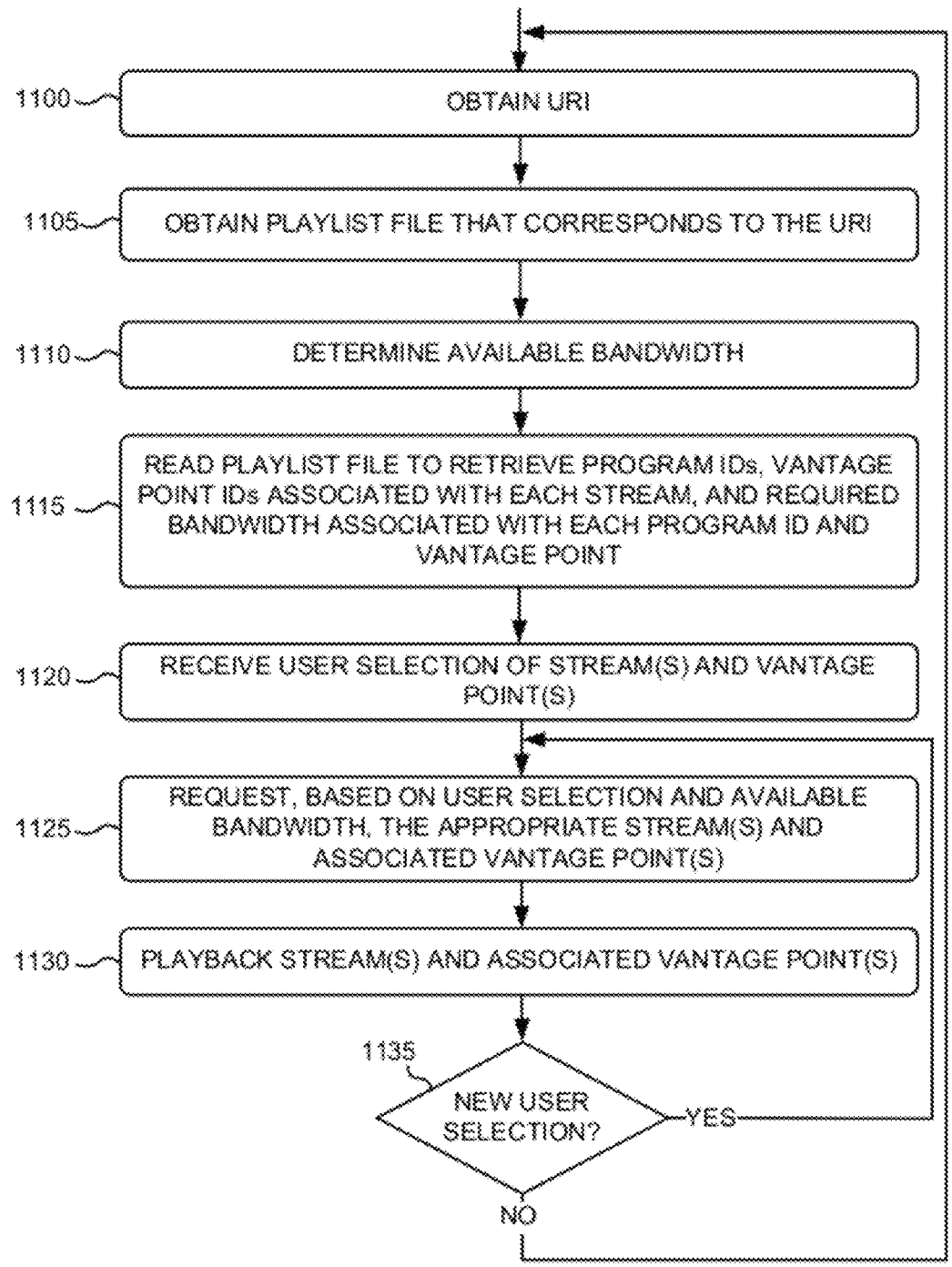
FIG. 11 is a flow diagram that illustrates an exemplary process for obtaining a playlist file and selecting media streams, having one or more vantage points on a given subject matter, for playback.

FIG. 11 is a flow diagram that illustrates an exemplary process for obtaining a playlist file and selecting media streams, having one or more vantage points on a given subject matter or content, for playback. The exemplary process of FIG. 11 may be implemented by client 105. The exemplary process of FIG. 11 is described below with reference to the messaging diagram of FIG. 12 and the user selection examples of FIGS. 13A and 13B.

Figure 12:
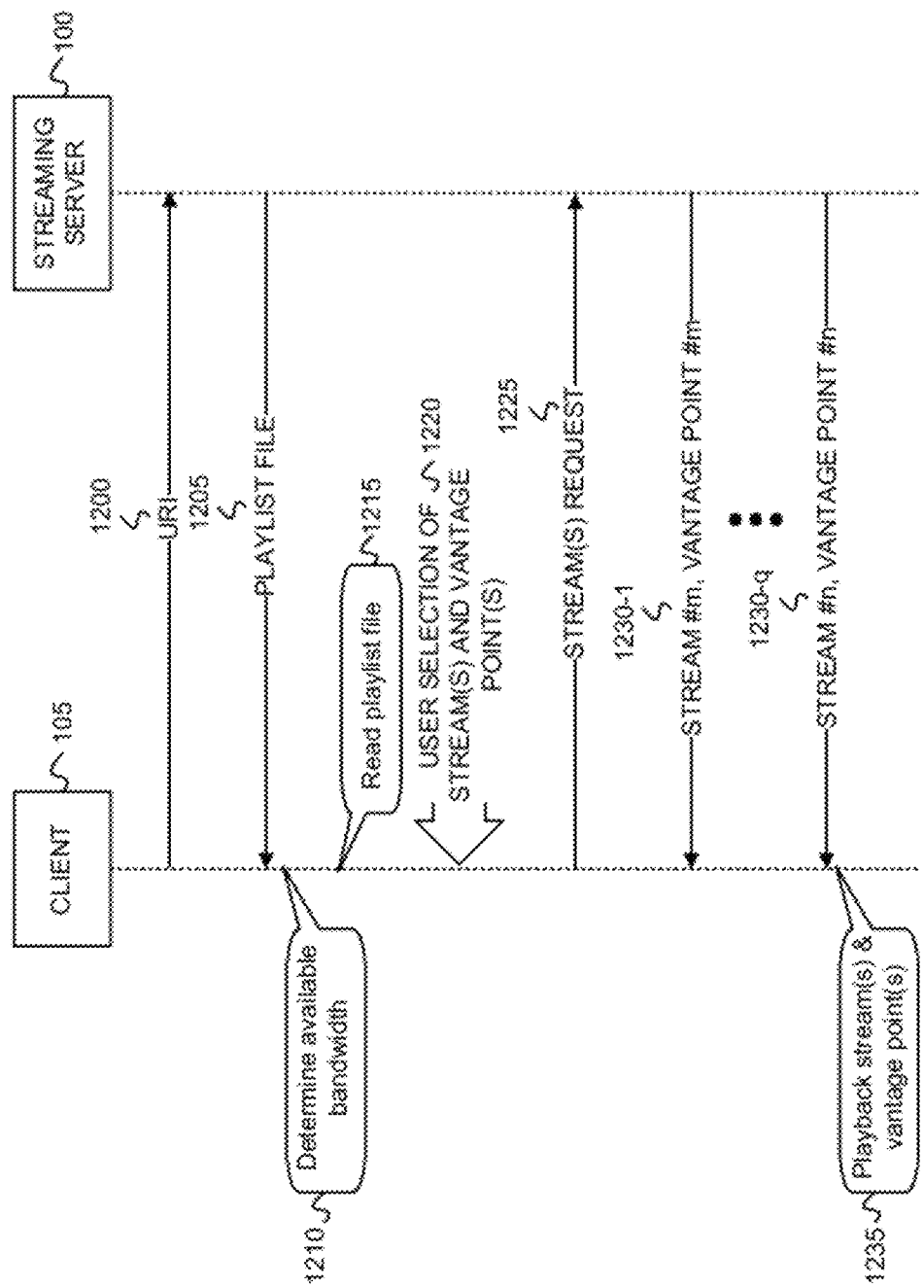
FIG. 12 is a diagram that illustrates exemplary messaging associated with the process of FIG. 11.

The exemplary process may include obtaining a Uniform Resource Identifier (URI) (block 1100). Client 105 may, for example, obtain the URI for a given media presentation from streaming server 100, or possibly from another node in network 310. Client 105 may obtain a playlist file that corresponds to the URI (block 1105). As shown in FIG. 12, client 105 may send the URI 1200 obtained in block 1100 to streaming server 100 to retrieve a corresponding playlist file 1205. Client 105 may determine the available bandwidth for receiving media streams from streaming server 100 (block 1110). The available bandwidth may include, for example, the total bandwidth that may be utilized by client 105 in communicating via network 310, or the available bandwidth may include only some portion of the total bandwidth that may be utilized by client 105 that is designated for use by media streams. As depicted in FIG. 12, client 105 may determine 1210 the available bandwidth for receiving media streams.

Client 105 may read the playlist file to retrieve program identifiers (IDs), vantage point IDs associated with each stream, and the required bandwidth associated with each program ID and vantage point (block 1115). Referring to playlist file 700 of FIG. 7, client 105 may read each tag 705-1 through 705-12 of playlist file 700 to retrieve a program ID attribute 620, a vantage point attribute 715, and a bandwidth attribute 630. FIG. 12 depicts client 105 reading 1215 playlist file 1205 received from streaming server 100.

Figure 13A:
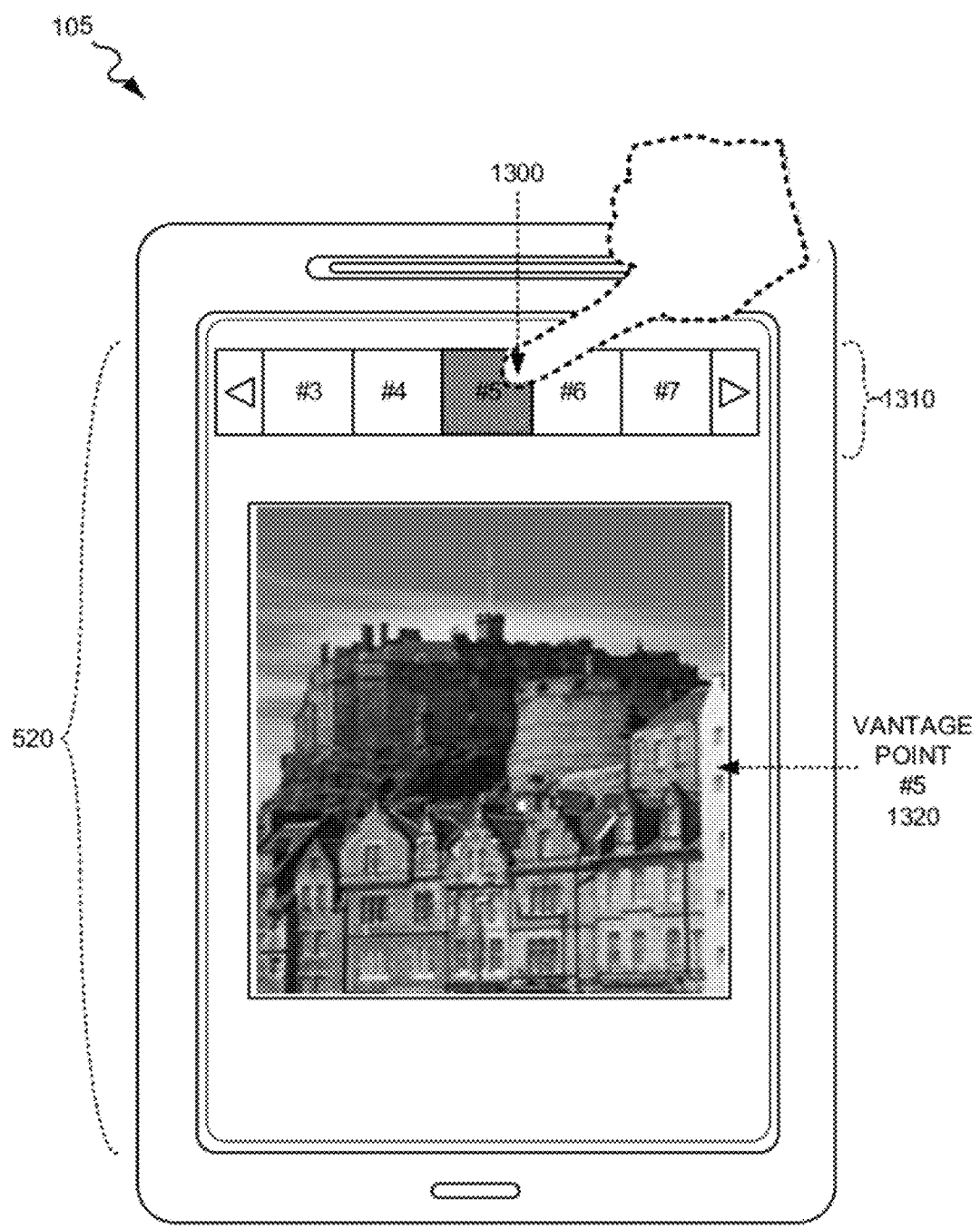
FIGS. 13A and 13B are diagrams that depict examples of the display of streams of media, on a display of a client, with each stream corresponding to a certain vantage point viewing a given subject matter.
Figure 13B:
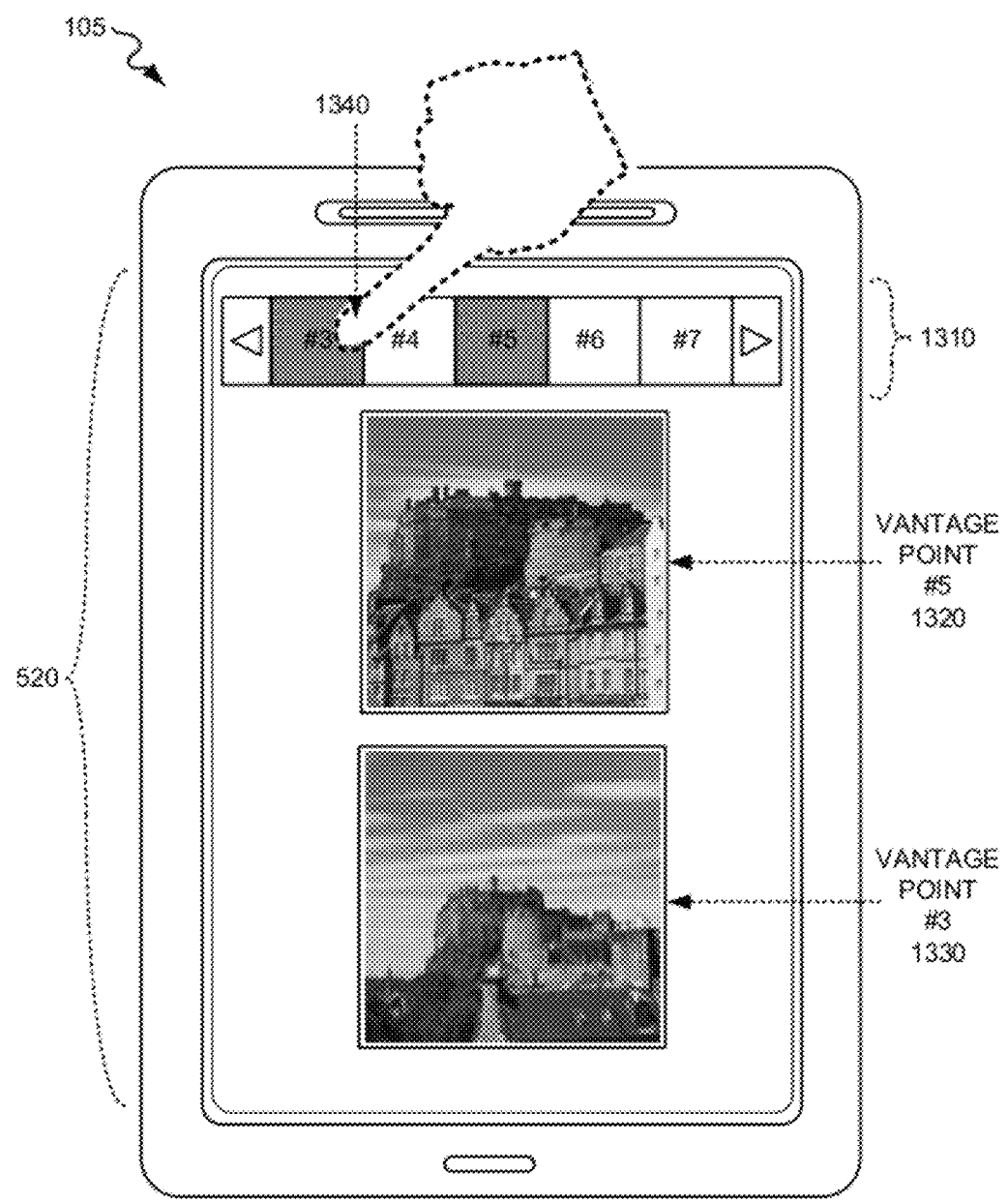

Client 105 may receive user selection of a stream(s) and vantage point(s) (block 1120). Client 105 may receive user selection of a stream(s) and its corresponding vantage point(s) via input device(s) 460. For example, as shown in FIGS. 13A and 13B, a touch panel of display 520 of client 105 may be used as a touch interface to enable a user to select a stream(s) and its corresponding vantage point(s). In other examples, a physical or virtual keyboard, or a mouse, etc. may be used to enter a user selection. As first shown in FIG. 13A, a user touch input 1300 may be applied to a selection region 1310 of display 520. User touch input 1300 may select, as shown in FIG. 13A, vantage point #5 1320 for viewing on display 520. FIG. 13B depicts a subsequent selection of vantage point cell #3 1330 via application of another user touch input 1340 to an appropriate portion of selection region 1310 of display 520. Referring back to FIG. 12, a user selection 1220 of a stream(s) and corresponding vantage point(s) may be received at client 105.

Client 105 may request, based on the user selection and the available bandwidth determined in block 1110, the appropriate stream(s) and associated vantage point(s) (block 1125). Referring to playlist file 700 of FIG. 7, client 105 may examine bandwidth attributes 630 of the user selected vantage point(s) and determine which combination of required bandwidths can be supplied to client 105 such that the available bandwidth determined in block 1110 is not exceeded. Client 105 may select the media streams whose total maximum required bandwidth is less than the available bandwidth determined in block 1110. FIG. 12 depicts client 105 sending a stream(s) request 1225 to streaming server 100 to obtain the sequence of media files for playback at client 105. In the case where a new stream is selected for viewing, client 105 may select the media streams whose total maximum required bandwidth is less than the available bandwidth determined in block 1110. For example, if a new stream is selected for viewing when two existing streams are already being viewed, the required bandwidth for the two existing streams may be adjusted (e.g., select a differently encoded stream that requires less bandwidth) to accommodate the newly selected stream.

Client 105 may playback the requested stream(s) and associated vantage point(s) (block 1130). Client 105 may retrieve the appropriate sequence of media files for each requested stream and vantage point and play back the media files. As shown in FIG. 12, in response to stream(s) request 930, streaming server 100 may send a sequence of media files associated with each stream and cell requested by client 105. For example, FIG. 12 depicts media files associated with selected stream #m and vantage point #m 1230-1 being sent to client 105. FIG. 12 further depicts media files associated with selected stream #n and vantage point #n 1230-$q$ being sent to client 105. FIG. 12 further shows client 105 playing back 1235 the stream(s) and cell(s) received at client 105.

Client 105 may determine whether a new user selection has been received (block 1135). Client 105 may receive a new user selection of a media stream(s) and its corresponding vantage point(s) via input device(s) 460. For example, a touch panel of a display of client 105 may be used as a touch interface to enable a user to select a new stream(s) and its corresponding vantage point(s). In other examples, a physical or virtual keyboard, or a mouse, etc. may be used to enter a new user selection. If a new user selection has been received (YES—block 1135), then the exemplary process may return to block 1125 with another request to streaming server 100. If a new user selection has not been received by client 105 (NO—block 1135), then the exemplary process may return to block 1100.

Exemplary implementations described herein implement two new attributes in informational tags within HTTP Live Streaming playlist files. One new attribute permits the division of a client display into multiple cells, where each cell has certain dimensions and a specific location on the client display and where each cell displays a different media stream. Another new attribute permits the selection of one or more vantage points associated with content or a given subject that may be played back on the client display. This new attribute, thus, permits the simultaneous display of multiple different vantage points associated with content or a given subject.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8A, 8B and 11, the order of the blocks may be varied in other implementations. Moreover, non-dependent blocks may be performed in parallel. Exemplary embodiments have been described herein as enabling the viewing of cells and/or vantage points using HTTP Live Streaming. However, the principles described herein may be applied to Smooth Streaming or Adaptive Bit Rate Streaming.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, at a client, a playlist file associated with a plurality of media streams, wherein each media stream includes a view of a same media content from a different vantage point;
    determining an available bandwidth for receiving media streams of the plurality of media streams;
    reading the playlist file to retrieve informational tags for each media stream, wherein each informational tag specifies, for a particular media stream, required bandwidth associated with the particular media stream, different cell coordinates for dimensions of a view of the particular media stream, and a vantage point associated with the particular media stream, wherein the different cell coordinates correspond to different display locations for each of multiple cells, wherein each of the multiple cells comprises a corresponding one of different media streams, wherein the multiple cells comprise a first cell and a second cell, and wherein the different cell coordinates specify first cell display dimensions and a first display location of the first cell for a first vantage point, and second cell display dimensions and a second display location of the second cell for the second vantage point;
    receiving a first user selection of the first cell of the multiple cells for the first vantage point, wherein receiving the first user selection of the first cell comprises receiving a selection in a first region of a display associated with the client corresponding to the first cell display dimensions and the first display location for the first cell;
    receiving a second user selection of the second cell of the multiple cells for the second vantage point, wherein receiving the second user selection of the second cell comprises receiving a selection in a second region of the display corresponding to the second cell display dimensions and the second display location for the second cell;
    requesting, based on the available bandwidth, the required bandwidths, the first user selection of the first cell, and the second user selection of the second cell, a first media stream of the plurality of media streams to be played in the selected first cell and a second media stream of the plurality of media streams to be played in the selected second cell;
    playing back the first media stream corresponding to the first vantage point only within the first region of the display corresponding to the first cell display dimensions and the first display location for the user-selected first cell; and
    playing back the second media stream corresponding to the second vantage point only within the second region of the display corresponding to the second cell display dimensions and the second display location for the user-selected second cell.

2. The method of claim 1, wherein each of the multiple cells comprises an individual view that displays the corresponding one of the different media streams.

3. The method of claim 1, further comprising:
    mapping the different cell coordinates of the selected first cell and the selected second cell to coordinates in a client coordinate system.

4. The method of claim 1, wherein requesting the first and second media streams comprises:
    examining the required bandwidths for the selected first cell and second cell; and
    determining which combination of required bandwidths can be supplied to the client such that the available bandwidth is not exceeded.

5. The method of claim 1, wherein the multiple cells comprise a third cell and wherein the different cell coordinates specify third cell display dimensions and a third display location for the third cell, and further comprising:
    receiving a third user selection of the third cell of the multiple cells, wherein receiving the third user selection of the third cell comprises receiving a selection in a third region of the display corresponding to the third cell display dimensions and the third display location for the third cell;

requesting, based on the third user selection of the third cell, a third media stream to be played in the selected third cell; and playing back the third media stream only within the third region of the display corresponding to the third cell display dimensions and the third display location for the user-selected third cell.

6. The method of claim 1, wherein the playlist file comprises a Hypertext Transfer Protocol (HTTP) Live Streaming playlist file.

7. A network device, comprising:
a communication interface configured to receive a playlist file associated with a plurality of media streams;
an input device;
a display; and
a processing unit configured to:
determine an available bandwidth for receiving media streams of the plurality of media streams, wherein each media stream includes a view of a same media content from a different vantage point,
read the playlist file to retrieve informational tags for each media stream, wherein each informational tag specifies, for a particular media stream, required bandwidth associated with the particular media stream, different cell coordinates for dimensions of a view of the particular media stream, and a vantage point associated with the particular media stream, wherein the different cell coordinates correspond to different display locations for each of multiple cells, wherein each of the multiple cells comprises a corresponding one of different media streams, wherein the multiple cells comprise a first cell and a second cell and wherein the different cell coordinates specify first cell display dimensions and a first display location of the first cell for a first vantage point, and second cell display dimensions and a second display location of the second cell for a second vantage point,
receive a first user selection of the first cell of the multiple cells for the first vantage point, wherein, when receiving the first user selection of the first cell, the processing unit is further configured to receive a selection, via the input device, in a first region of the display corresponding to the first cell display dimensions and the first display location for the first cell,
receive a second user selection of the second cell of the multiple cells for the second vantage point, wherein, when receiving the second user selection of the second cell, the processing unit is further configured to receive a selection, via the input device, in a second region of the display corresponding to the second cell display dimensions and the second display location for the second cell,
request, based on the available bandwidth, the required bandwidths, the first user selection of the first cell and the second user selection of the second cell, a first media stream of the plurality of media streams to be played in the selected first cell and a second media stream of the plurality of media streams to be played in the selected second cell,
play back, on the display, the first media stream corresponding to the first vantage point only within the first region of the display corresponding to the first cell display dimensions and the first display location for the user-selected first cell, and play back, on the display, the second media stream corresponding to the first vantage point only within the second region of the display corresponding to the second cell display dimensions and the second display location for the user-selected second cell.

8. The network device of claim 7, wherein each of the multiple cells comprises an individual view that displays the corresponding one of the different media streams.

9. The network device of claim 7, wherein, when requesting the first and second media streams, the processing unit is configured to:
examine the required bandwidths for the user selected first and second cells, and
determine which combination of required bandwidths can be supplied to the network device such that the available bandwidth is not exceeded.

10. The network device of claim 7, wherein the multiple cells comprise a third cell and wherein the different cell coordinates specify third cell display dimensions and a third display location for the third cell and wherein the processing unit is further configured to:
receive a third user selection of the third cell the multiple cells, wherein, when receiving the third user selection of the third cell, the processing unit is configured to receive a selection in a third region of the display corresponding to the third cell display dimensions and the third display location for the third cell;
request, based on the third user selection of the third cell, a third media stream to be played in the selected third cell, and
play back, on the display, the third media stream only within the third region of the display corresponding to the third cell display dimensions and the third display location for the user-selected third cell.

11. The network device of claim 7, wherein the playlist file comprises a Hypertext Transfer Protocol (HTTP) Live Streaming playlist file.

12. A method, comprising:
receiving, at a client device, a playlist file that includes a plurality of informational tags that specify different cell coordinates for each of multiple cells, wherein the different cell coordinates specify cell display dimensions and a different display location for each of the multiple cells,
wherein the plurality of informational tags further specify multiple first different bandwidth requirements corresponding to a first one of the multiple cells and a first media stream, multiple second different bandwidth requirements corresponding to a second one of the multiple cells and a second media stream, and vantage points associated with corresponding media streams, wherein the first media stream includes a view of a particular media content at a first vantage point and the second media stream includes a view of the particular media content at a second vantage point;
determining, at the client device, an available bandwidth for receiving media streams;
receiving, at the client device, user selections of the first one of the multiple cells and the first vantage point and the second one of the multiple cells and the second vantage point, within which to play the first media stream and the second media stream, from the playlist file, by receiving selections of a first region and a second region on a display of the client device;
selecting, at the client device from among the plurality of informational tags, one of the multiple first different bandwidth requirements corresponding to the first one of the multiple cells and the first vantage point, and one of the multiple second different bandwidth requirements corresponding to the second one of the multiple cells and the second vantage point, such that a combination of the selected bandwidth requirements does not exceed the determined available bandwidth; and simultaneously playing back the first media stream in the first one of the multiple cells and the second media stream in the second one of the multiple cells.

13. The method of claim 12, wherein the different cell coordinates specify first cell display dimensions and a first display location for the first one of the multiple cells, and second cell display dimensions and a second display location for the second one of the multiple cells and wherein receiving the user selections of the first one of the multiple cells and the second one of the multiple cells comprises:

receiving a first user selection of the first one of the multiple cells, wherein receiving the first user selection of the first one of the multiple cells comprises receiving a selection in the first region of the display corresponding to the first cell display dimensions and the first display location for the first one of the multiple cells; and receiving a second user selection of the second one of the multiple cells, wherein receiving the second user selection of the second one of the multiple cells comprises receiving a selection in the second region of the display corresponding to the second cell display dimensions and the second display location for the second one of the multiple cells.

14. A network device, comprising:
an input device;
a display; and
a processing unit configured to:
receive a playlist file that includes a plurality of informational tags that specify different cell coordinates for each of multiple cells, wherein the different cell coordinates specify cell display dimensions and a different display location for each of the multiple cells, wherein the plurality of informational tags further specify multiple first different bandwidth requirements corresponding to a first one of the multiple cells and a first media stream, multiple second different bandwidth requirements corresponding to a second one of the multiple cells and a second media stream, and vantage points associated with corresponding media streams, wherein the first media stream includes a view of a particular media content at a first vantage point and the second media stream includes a view of the particular media content at a second vantage point;

determine an available bandwidth for receiving media streams, receive, via the input device, user selections of the first one of the multiple cells and the first vantage point and the second one of the multiple cells and the second vantage point, within which to play the first media stream and the second media stream, from the playlist file by receiving selections of a first region and a second region on the display, select, from among the plurality of informational tags, one of the multiple first different bandwidth requirements corresponding to the first one of the multiple cells and the first vantage point and one of the multiple second different bandwidth requirements corresponding to the second one of the multiple cells and the second vantage point such that a combination of the selected bandwidth requirements does not exceed the determined available bandwidth, and simultaneously play back the first media stream in the first one of the multiple cells and the second media stream in the second one of the multiple cells on the display.

15. The network device of claim 14, wherein the different cell coordinates specify first cell display dimensions and a first display location for the first one of the multiple cells, and second cell display dimensions and a second display location for the second one of the multiple cells and wherein, when receiving the user selections of the first one of the multiple cells and the second one of the multiple cells, the processing unit is configured to:

receive, via the input device, a first user selection of the first one of the multiple cells, wherein, when receiving the first user selection of the first one of the multiple cells, the processing unit is further configured to receive a selection in the first region of the display corresponding to the first cell display dimensions and the first display location for the first one of the multiple cells, and receive, via the input device, a second user selection of the second one of the multiple cells, wherein, when receiving the second user selection of the second one of the multiple cells, the processing unit is further configured to receive a selection in the second region of the display corresponding to the second cell display dimensions and the second display location for the second one of the multiple cells.

16. The network device of claim 14, wherein the network device comprises one of a laptop, palmtop or tablet computer; a cellular telephone; a personal digital assistant (PDA); a set top box (STB); or a television (TV).

17. The method of claim 1, wherein receiving the first user selection of the first cell comprises receiving a first user touch in the first region of a device's touchscreen display corresponding to the first cell display dimensions and the first display location for the first cell, and wherein receiving the second user selection of the second cell comprises receiving a second user touch in the second region of the device's touchscreen display corresponding to the second cell display dimensions and the second display location for the second cell.

18. The network device of claim 7, wherein the input device comprises a touchscreen of the display, wherein receiving the first user selection of the first cell comprises receiving a first user touch in the first region of the touchscreen of the display corresponding to the first cell display dimensions and the first display location for the first cell, and wherein receiving the second user selection of the second cell comprises receiving a second user touch in the second region of the touchscreen of the display corresponding to the second cell display dimensions and the second display location for the second cell.

19. The method of claim 13, wherein receiving the first user selection of the first cell comprises receiving a first user touch in the first region of the display corresponding to the first cell display dimensions and the first display location for the first cell, and wherein receiving the second user selection of the second cell comprises receiving a second user touch in the second region of the display corresponding to the second cell display dimensions and the second display location for the second cell.

20. The network device of claim 15, wherein the input device comprises a touchscreen of the display, wherein receiving the first user selection of the first cell comprises receiving a first user touch in the first region of the touchscreen of the display corresponding to the first cell display dimensions and the first display location for the first cell, and wherein receiving the second user selection of the second cell comprises receiving a second user touch in the second region of the touchscreen of the display corresponding to the second cell display dimensions and the second display location for the second cell.

21. The method of claim 1, wherein the first media stream corresponding to the selected first cell is played back simultaneously with the second media stream corresponding to the selected second cell.

22. The method of claim 5, wherein the first media stream corresponding to the selected first cell, the second media stream corresponding to the selected second cell, and the third media stream corresponding to the selected third cell are played back simultaneously.

23. The network device of claim 7, wherein the first media stream corresponding to the selected first cell is played back simultaneously with the second media stream corresponding to the selected second cell.

\* \* \* \* \*